(12) United States Patent
Mayne

(10) Patent No.: US 6,707,638 B2
(45) Date of Patent: Mar. 16, 2004

(54) SLIDER IMPEDANCE MECHANISM TO PREVENT CARTRIDGE EJECTION DURING OPERATION

(75) Inventor: Doug Mayne, Ogden, UT (US)

(73) Assignee: Iomega Corporation, San Diego, CA (US)

( * ) Notice: Subject to any disclaimer, the term of this patent is extended or adjusted under 35 U.S.C. 154(b) by 342 days.

(21) Appl. No.: 09/878,030

(22) Filed: Jun. 8, 2001

(65) Prior Publication Data

US 2002/0186501 A1 Dec. 12, 2002

(51) Int. Cl.[7] .............................................. G11B 17/04
(52) U.S. Cl. ..................................................... 360/99.06
(58) Field of Search ........................... 360/99.06, 99.08, 360/99.12, 99.02, 97.01, 96.5, 96.6; 369/75.1, 75.2, 77.1, 77.2

(56) References Cited

U.S. PATENT DOCUMENTS

| | | | |
|---|---|---|---|
| 3,945,040 A | 3/1976 | Staar ....................... | 242/326.1 |
| 4,604,666 A | 8/1986 | Kitahara et al. ......... | 360/99.06 |
| 4,965,685 A | 10/1990 | Thompson et al. ...... | 360/97.01 |
| 5,485,330 A | 1/1996 | Hirose et al. ............ | 360/99.06 |
| 6,052,256 A | 4/2000 | Kawakami ............... | 360/99.06 |
| 6,055,125 A | 4/2000 | Muse et al. .............. | 360/99.06 |
| 6,125,006 A | 9/2000 | Khuu ....................... | 360/264.7 |
| 6,157,514 A | 12/2000 | Larsen et al. ............ | 360/99.06 |

Primary Examiner—A. J. Heinz
Assistant Examiner—Angel Castro
(74) Attorney, Agent, or Firm—James T. Hagler

(57) ABSTRACT

A disk drive has a cartridge eject mechanism for ejecting the cartridge from the drive. An impedance lever is added to the eject mechanism to prevent cartridge ejection when the read/write heads of the drive are reading or writing data. The impedance lever has an impedance projection, a rotation spring and an actuator follower projection which interacts with the sliding lever of the eject mechanism to prevent untimely ejection of the disk cartridge.

5 Claims, 13 Drawing Sheets

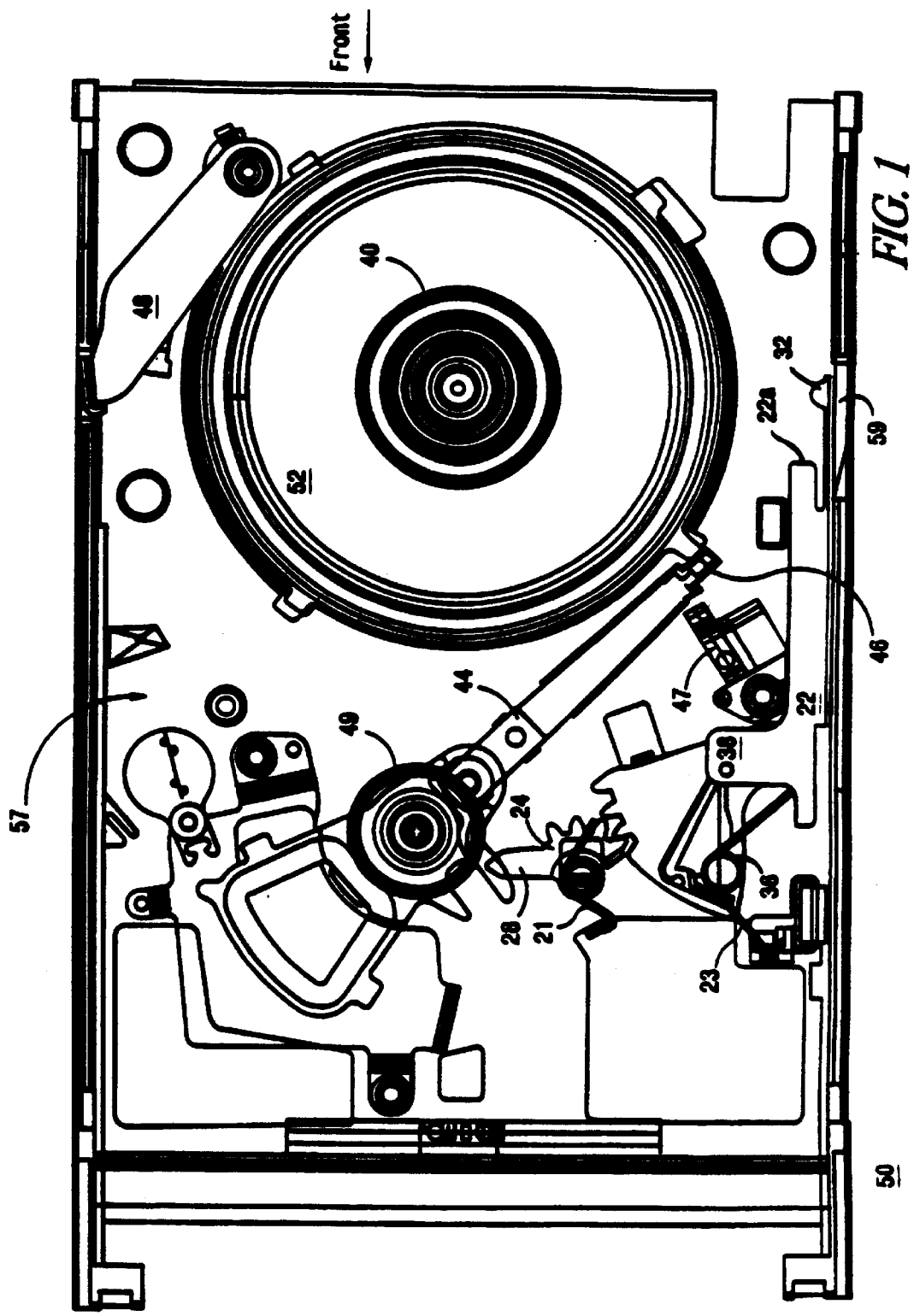

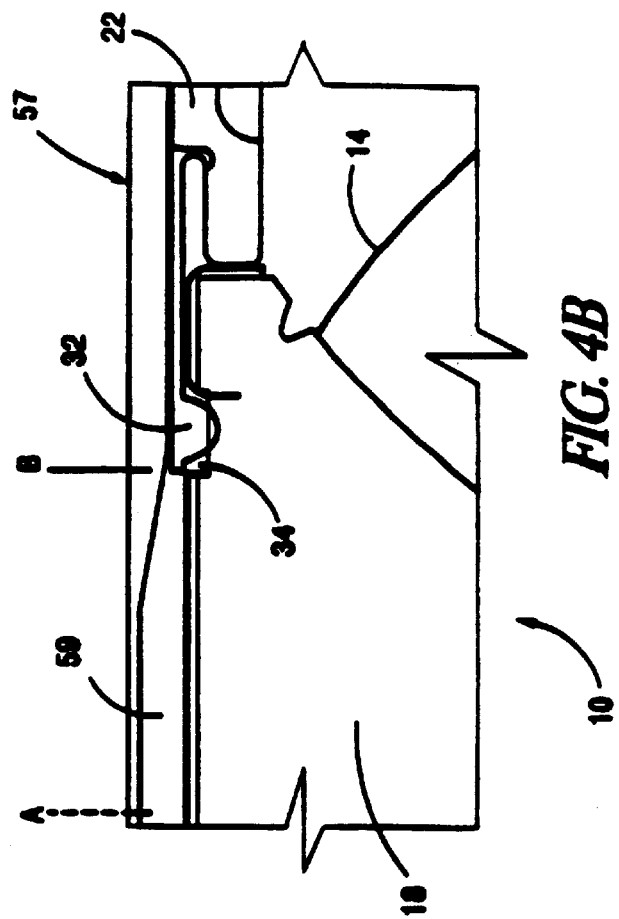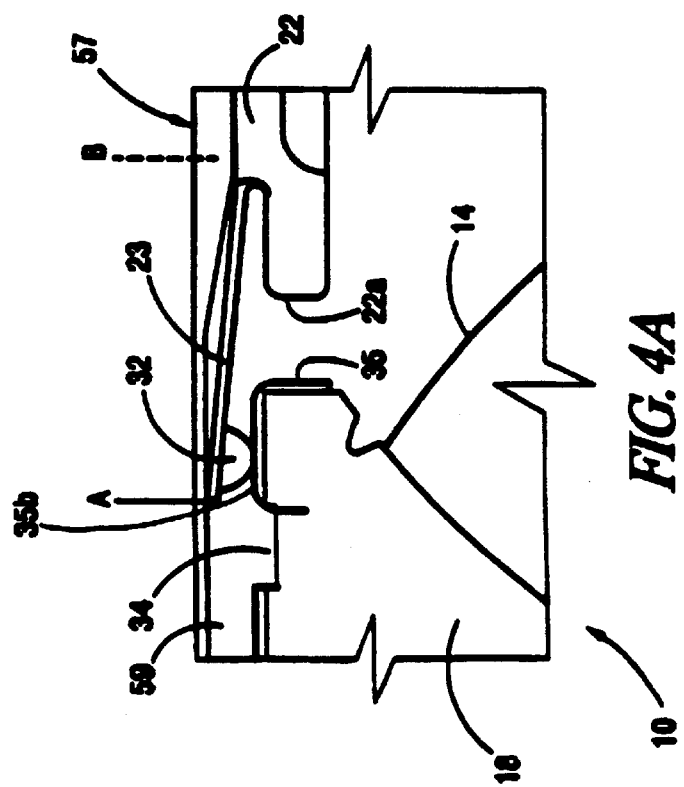

SLIDER IMPEDANCE MECHANISM TO PREVENT CARTRIDGE EJECTION DURING OPERATION

The present invention relates to data storage devices, or disk drives, for recording digital information on or reading digital information from a flexible magnetic media, which is disposed within a cartridge shell, and more particularly, to an apparatus to prevent the ejection of a cartridge from a disk drive during operation of the disk drive.

BACKGROUND OF THE INVENTION

Cartridge based tape and disk data storage devices for storing digital electronic information have been in use in the computer industry for several decades. Removable disk cartridges typically comprise an outer casing or shell that houses a disk-shaped magnetic, magneto-optical or optical storage medium upon which information can be stored. The cartridge shell often comprises upper and lower halves that are formed of injection molded plastic and are joined together to house the disk. Magnetic disk media can be either rigid or flexible and are mounted on a hub that rotates freely within the cartridge. When the cartridge is inserted into a disk drive, a spindle motor in the drive engages the disk hub in order to rotate the disk within the cartridge at a given speed. The outer shell of the cartridge typically has a media access opening proximate one edge to provide the recording heads of the drive with access to the disk. A shutter or door mechanism is provided to cover the head access opening when the cartridge is not in use to prevent dust or other contaminants from entering the cartridge and settling on the recording surface of the disk. The shutter commonly is biased to a closed position with a spring. To open the shutter and gain access to the media, the drive employs a mechanism that overcomes the bias of the spring.

Disk drives for use with such removable disk cartridges typically employ either a linear actuator mechanism or a radial arm actuator mechanism for positioning the read/write head(s) of the disk drive on the recording surface(s) of the storage medium, or disk. Because the disk cartridges are designed to be removable from the drive, the linear or radial arm actuators must be able to move off, and away from, the storage medium to a retracted position in order to prevent damage to the head(s) when a cartridge is inserted and removed from the disk drive. Moreover, many removable cartridge disk drives employ a pair of opposing read/write heads for recording and reproducing information on both sides of a storage medium. Typically, the opposing heads are disposed on flexible suspension arms at the distal end of an actuator that allow the heads to fly closely over the respective surfaces of the rotating disk.

Disk drives further require a mechanism for allowing the heads to load only after a cartridge is inserted into the drive. The actuator that carries the recording heads of the disk drive across the recording surfaces of the disk should not be allowed to move unless a disk cartridge is present. In the prior art, mechanical or electrical switches typically are employed to determine the presence of a disk cartridge within the drive. Such switches typically are positioned so that when a disk cartridge is inserted fully into the drive, the cartridge contacts the switch, thereby providing an indication that the disk cartridge is present.

When a user has completed the use of a disk cartridge, a mechanism must be provided to eject the disk cartridge from the drive and substantially simultaneously ensure that the read/write heads are retracted from the disk into a predetermined safe position so as to prevent any damage to the read/write heads. Typically, a tray or spring loaded lever is used to push the cartridge out of the drive. The spring loaded tray or lever is often coupled to the head protection mechanism so that the protection of the heads occurs in unison with cartridge ejection.

A system for the loading and ejection of a cartridge is disclosed in commonly-assigned U.S. Pat. No. 6,055,125 (the "125 patent"), entitled "Cartridge Load and Eject Mechanism for a Removable Cartridge Drive," which issued Apr. 25, 2000 and is hereby incorporated by reference in its entirety. FIGS. 1–5C show the mechanism disclosed in the 125 patent.

FIG. 1 is a top view of a disk drive 50 with its top cover removed and the components moved from their relative operational positions for clarity. Drive 50 comprises a chassis 57, an actuator 49 (preferably a rotary actuator), including an opposing pair of load beams 44 having a read/write head 46 disposed at the end of each load beam, a spindle motor 52 and a spindle 40, a load ramp 47, a shutter opening arm 48, and a load/eject mechanism which includes pinion 36, gear 24, sliding lever 22, and lever compression spring 23. The operation of the load eject mechanism is described more fully below. A disk cartridge can be inserted into the front of the drive in the direction indicated by the arrow. During insertion, the cartridge slides linearly along the top surface of chassis 57 and spindle motor 52 for engagement with the read/write heads 46.

FIGS. 2A and 2B present top and bottom views of an exemplary disk cartridge 10 for use with the drive 50 of the present invention. Disk cartridge 10 comprises a flexible magnetic disk 14, a disk media hub 12, top and bottom cartridge shell halves 18a and 18b, a rotary shutter 16, and a shutter pivot pin 20. Shutter 16 rotates within cartridge 10 between an open position and a closed position. In the open position, shutter 16 is rotated away from a generally wedge shaped disk access opening 13 that is formed in cartridge shell 18, exposing the top and bottom surfaces of disk 14 for access by a read/write head or heads contained within a disk drive. In the closed position, shutter 16 is rotated over disk access opening 13, sealing disk cartridge 10 and protecting disk 14. The flexible magnetic disk 14 is formed of a thin polymer film, such as MYLAR, and has a thin magnetic layer uniformly dispersed on the top and bottom surfaces. The magnetic surfaces magnetically sensitize the flexible disk 14 and enable the storage of digital data when the surface is brought into magnetic communication with a magnetic transducer of the type commonly found in disk drives. Disk 14 is generally circular with a circular hole proximate the center of disk 14.

Media hub 12 is firmly secured to disk 14 such that the center of hub 12 is aligned proximate the center of disk 14. Media hub 12 is preferably attached to disk 14 via a well-known adhesive process. The disk and hub assembly are rotatably disposed between upper and lower cartridge shell halves 18a, 18b. Lower cartridge shell half 18b has a substantially circular spindle access opening 18c such that a disk drive can provide rotational power to disk 14 via hub 12. Preferably, said access opening presents a rounded edge.

Cartridge shell 18 also comprises a side cut-out 34 and abutment surface 35. As explained more fully below, cut-out 34 and abutment surface 35 engage sliding lever 22 during cartridge insertion and ejection. Cut-out 34 functions to retain the cartridge in drive 50 and ensure proper cartridge insertion while abutment surface 35 provides a flat surface for engagement and spring loading of sliding lever 22.

Referring now to FIGS. 3A and 3B, the operation of disk drive 50 in conjunction with a cartridge 10 is illustrated. FIG. 3A shows the drive mechanisms in the positions that are assumed prior to insertion of a cartridge 10, which is the same positions that are assumed after ejection of a disk cartridge. By contrast, FIG. 3B shows the positions of the drive mechanisms when a cartridge is fully inserted and the drive is operational. Referring first to FIG. 3A, actuator 49 is retracted onto load ramps 47. Sliding lever 22 is released (i.e., biased forward). And, shutter operating arm 52 is ready to engage and rotate open a shutter 16. Shutter operating arm 52 comprises a finger 52a that is adapted to engage shutter 16 and rotate it toward the open position during cartridge insertion. Spring tension is supplied to shutter 16 from within cartridge 10 so that shutter 16 rotates back to the closed position during ejection of cartridge 10 from drive 50. Referring next to FIG. 3B, the cartridge is shown in the fully inserted position in drive 50. The actuator 49 is now allowed to move its read/write heads 46 across the surface of disk 14, reading and writing information. Spring 23 is loaded to provide an ejection force to cartridge 10 via sliding lever 22 during ejection of cartridge 10 from drive 50.

Referring also to FIGS. 4A and 4B, the operation of sliding lever 22 is further illustrated. Sliding lever 22 comprises a flexible arm 23 with a protuberance 32 proximate the distal end. Flexible arm 23 comprises a flexible material that bends with the application of a sideward force. Moreover, protuberance 32 has a shape, preferably cammed, that is adapted to engage the front corner 35 of cartridge 10 and to facilitate sideward movement of flexible arm 23. As cartridge 10 is inserted into delve 50, protuberance 32 engages the front corner 35 of cartridge 10. As a result, when a cartridge engages protuberance 32, it rides up onto and slides along the side wall 35b of cartridge 10. An opening 59 in the sidewall of chassis 57 provides clearance for the flexible arm 23 to flex away from cartridge 10 as cartridge 10 slides into the drive. When cartridge 10 is sufficiently far enough into drive 10, protuberance 32 aligns with cut-out 34 in cartridge 10 proximate the position indicated by line "A" and flexes back, engaging cut-out 34.

As cartridge 10 is inserted yet further into drive 50, abutment surface 35 of cartridge 10 contacts an end 22a of sliding lever 22, thereby urging sliding lever 22 to slide in tandem with cartridge 10 as cartridge 10 continues into drive 50. As cartridge 10 moves further into drive 50, sliding lever 22 slides from a position proximate the line "A" to a position proximate the line "B." At this point, flexible arm 23 has moved into chassis 57 past sidewall opening 59, thereby constraining flexible arm 23 by the chassis sidewall. The sideward movement of flexible arm 23 is thus constrained, thereby locking the cartridge 10 into drive 50. Furthermore, the insertion force on cartridge 10 and sliding lever 22 compressively loads spring 23 (see FIG. 3B).

Referring now to FIGS. 5A and 5B in conjunction with FIGS. 3A and 3B, the operation of the load/eject mechanism of the present invention is described. From a user's standpoint, a cartridge 10 is loaded into operating position in drive 50 by pushing the cartridge 10 forward into drive 50 and then releasing the cartridge. Cartridge 10 is ejected from drive 50 by again pushing cartridge 10 forward into drive 50 and releasing. The load/eject mechanism that provides this user interface comprises the sliding lever 22, pinion 36, and gear 24. Pinion 36 comprises teeth 36a, and race 26. In addition to the details provided above, sliding lever 22 comprises an ear 39 with a post 38 projecting downwardly from ear 39 and into race 26 of pinion 36. Gear 24 comprises a coil spring 21, latch 28, and teeth 24a. Teeth 24a engage teeth 36a of pinion 36, and latch 28 provides a mechanism to lock actuator 49 in a retracted position when not in operation.

In FIG. 5A, cartridge 10 has been pushed far enough into drive 50 such that protuberance 32 has engaged cut-out 34 in cartridge 10. At this point, cartridge abutment surface 35 has engaged sliding lever 22, which is in a position proximate the line "B."Pinion 36 is in a rotary position proximate the line "C" and gear 24 is in a rotary position proximate the line "E." Post 38 of sliding lever 22 is in race 26 proximate location "a."As cartridge 10 is pushed further into drive 50, it urges sliding lever 22 from a position proximate line "A" to a position proximate line "B," moving post 38 along race 26 from a point proximate "a" to a point proximate "b." This movement causes the post to travel along the path indicated by the dashed lines in race 26 in FIG. 5B. The movement of post 38 along race 26 provides a rotational force to pinion 36 causing it to rotate counterclockwise from a position proximate line "C" to a position proximate line "D." Simultaneously, as sliding lever 22 travels further into drive 50, spring 23 is loaded. While pinion 36 rotates, teeth 36a engage teeth 24a, rotating gear 24, against the bias of spring 21, from a position proximate line "E" to a position proximate line "F."

Just as cartridge 10 travels past its operating position, post 38 engages the end of the first leg of race 26 at point "a1," preventing further forward travel of post 38. Because post 38 cannot travel farther forward, sliding lever 22 and cartridge 10 cannot move forward, signaling the user that cartridge 10 has been pushed fully into drive 50. When the user releases cartridge 10, spring 23 biases post 38 to travel within race 26 from point "a1" to point "b," where it comes to rest with cartridge 10 locked in the operating position. Latch 28 has rotated with gear 24 away from lever 45 on actuator 49 by an amount indicated by the angle between lines "E" and "F." As a result of the rotation of latch 28, actuator 49 is free to move read/write heads 46 over the surface of disk 14.

FIG. 5C shows an isometric view of the engagement between post 38 of sliding lever 22 and race 26 of pinion 36. Race 26 is inset into pinion 36 providing a track for post 38. Post 38 projects downwardly from ear 39 of sliding lever 22 into race 26. Ramp 25 in race 26 helps control the direction of travel of post 38 in race 26, ensuring that post 38 can only travel around race 26 in a counter-clockwise direction.

Disk ejection is reversed from the process described above. To start the ejection, a user once again pushes cartridge 10 forward into drive 50. The forward movement of cartridge 10 moves sliding lever 22 into drive 50. This forward movement of lever 22 moves post 38 in race 26 from a point proximate "b" to a point proximate "c." Simultaneously, pinion 36 is free to rotate clockwise with the aid of spring loaded gear 24. At this point, forward movement of cartridge 10 once again is constrained, indicating to the user to stop pushing on cartridge 10.

As the user stops pushing on cartridge 10, spring 23 biases sliding lever 22 from a point proximate line "B" to a point proximate line "A," as post 38 moves down race 26 from a point proximate "c" to a point proximate "a." The spring force applied to sliding lever 22 also provides a force to eject cartridge 10 from drive 50. Meanwhile, as spring 21 rotates gear 24 counter-clockwise, latch 28 moves actuator 49 to a parked position via lever 45. The heads are parked by moving load beams 44 and heads 46 onto load ramp 47.

Existing devices allow a user to eject a cartridge while the user is reading from or writing to the disk, but the device will sense when an untimely ejection is occurring and stop the reading or writing operation. Damage to the disk or loss of data, however, can result before the drive stops reading or writing. In addition, such devices utilize costly electrical contacts to sense when ejection of the cartridge is taking place. It is, therefore, desirable to provide a mechanism to prevent cartridge ejection during operation of a drive that prevents damage to the disk and also is relatively simple and inexpensive.

SUMMARY OF THE INVENTION

In accordance with the present invention a slider impedance lever is added to an existing cartridge eject mechanism to prevent cartridge ejection while the drive is writing to, or reading from, the disk.

More particularly, the slider impedance lever is under the pinion in gear of the cartridge eject mechanism and both rotate around the same pin. The slider impedance lever interacts with the eject slider and head stack assembly and moves independent of the pinion gear. The slider impedance lever rotates when the head stack assembly loads and unloads heads onto and off the load ramp of the disk drive. The slider impedance lever has a projection, or bend-up, which interacts with the head stack assembly. A built-in spring on the impedance lever rotates the lever when the head stack assembly unloads onto the media. An impedance projection, i.e., bend-up, on the impedance lever interacts with the eject slider pin of the cartridge eject mechanism.

The slider impedance lever of the present invention is a simple sheet metal part which can easily be added to an existing cartridge eject mechanism in a disk drive. The foregoing and other objects, features and advantages of the invention will be better understood from the following more detailed description and appended claims.

BRIEF DESCRIPTION OF THE DRAWINGS

As shown, most of the following figures are enlarged views of the features of the present invention.

FIG. 1 is a top plan view of a disk drive according to the present invention;

FIGS. 4A and 4B show the operation of the cartridge retention mechanism in accordance with the present invention;

DETAILED DESCRIPTION OF THE PREFERRED EMBODIMENTS

For illustrative purposes, the present invention will be described with reference to the disk drive and cartridge load and eject mechanism of the 125 patent. Accordingly, the present invention is not limited to the embodiment of the 125 patent and can be employed with other cartridge and drive types and configurations.

Figure 6:
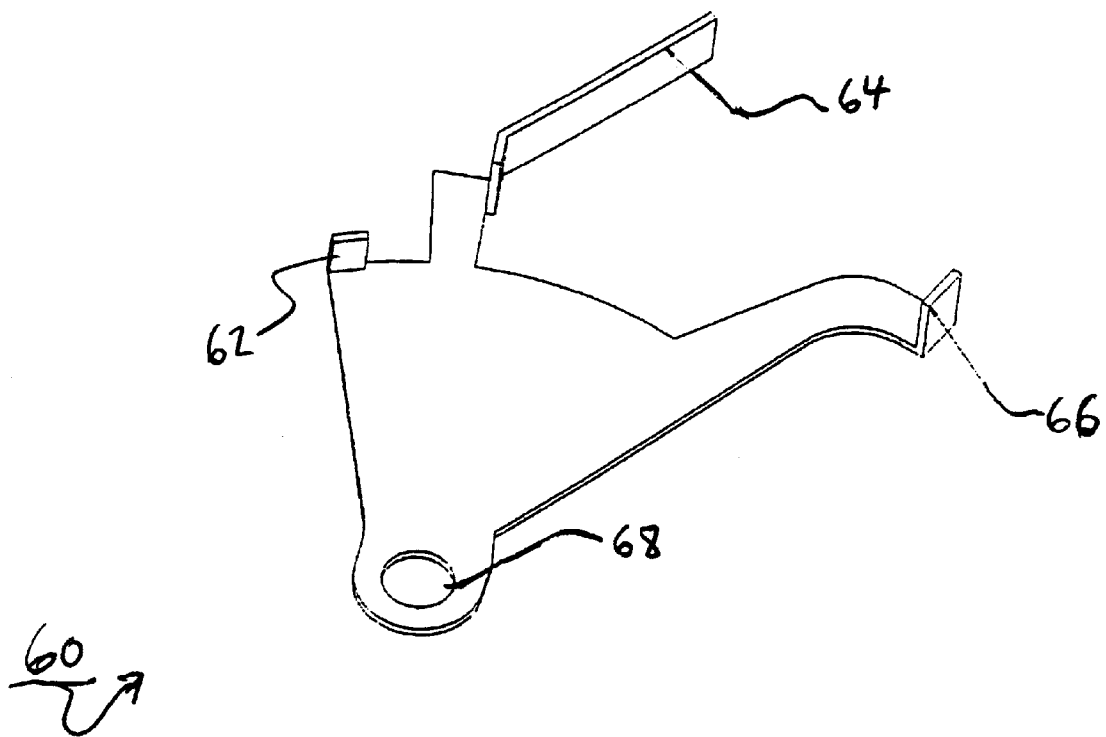
FIG. 6 is a top isometric view of a preferred embodiment of a slider impedance mechanism of the present invention.

FIG. 6 shows a top isometric view of a preferred embodiment of a slider impedance lever, or mechanism, 60 of the present invention. The slider impedance mechanism 60 prevents ejection of a disk cartridge during operation of a disk drive to prevent damage to the disk. Preferably, the slider impedance mechanism 60 comprises an impedance projection, or bend-up, 62, a rotation spring 64, an actuator follower projection, or bend-up, 66, and a pivot hole 68, about which the mechanism 60 rotates.

Figure 7:
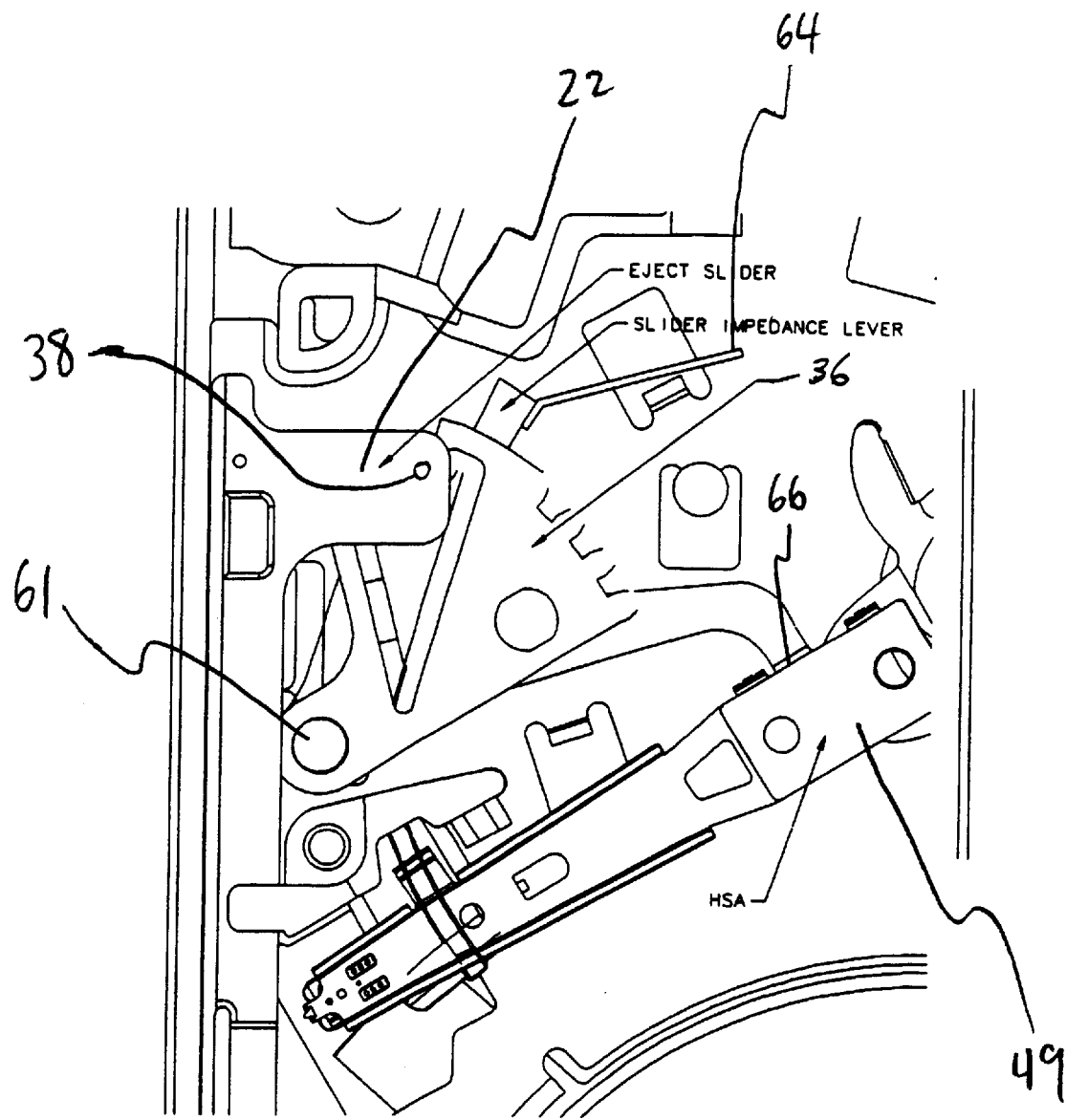
FIG. 7 is a top plan view of the slider impedance mechanism of FIG. 6 in cooperation with a disk drive when the actuator is in its parked position.

The slider impedance mechanism 60 rotates via pivot hole 68 about pivot point 61, the same point about which pinion 36 rotates, as shown in FIGS. 6 and 7. In addition, the slider impedance mechanism 60 is situated underneath the pinion 36, although it moves independent of the pinion 36.

The rotation spring 64 of the slider impedance mechanism 60 imparts a clockwise bias (as represented by arrow 64A and FIG. 7A) to the mechanism 60. The actuator follower bend-up 66 thereby interacts with and follows the actuator 49 as it rotates the read/write heads 46 on and off the disk 14. Consequently, as described in more detail below, the impedance bend-up 62 interacts with the post 38 of the sliding lever 22 to prevent untimely ejection of the cartridge 10.

FIG. 7 shows a top plan view of the slider impedance mechanism 60 of FIG. 6 in cooperation with a disk drive when the actuator 49 is in its parked position, i.e., not reading from or writing to the disk 14. As shown in FIG. 7, the impedance mechanism 60 is situated below the pinion 36 and both rotate about pivot point 61. Also shown in FIG. 7, the actuator follower bend-up 66 is pressing against the actuator 49, as the actuator 49 is in the position closest to the mechanism 60 when parked.

Figure 2A:
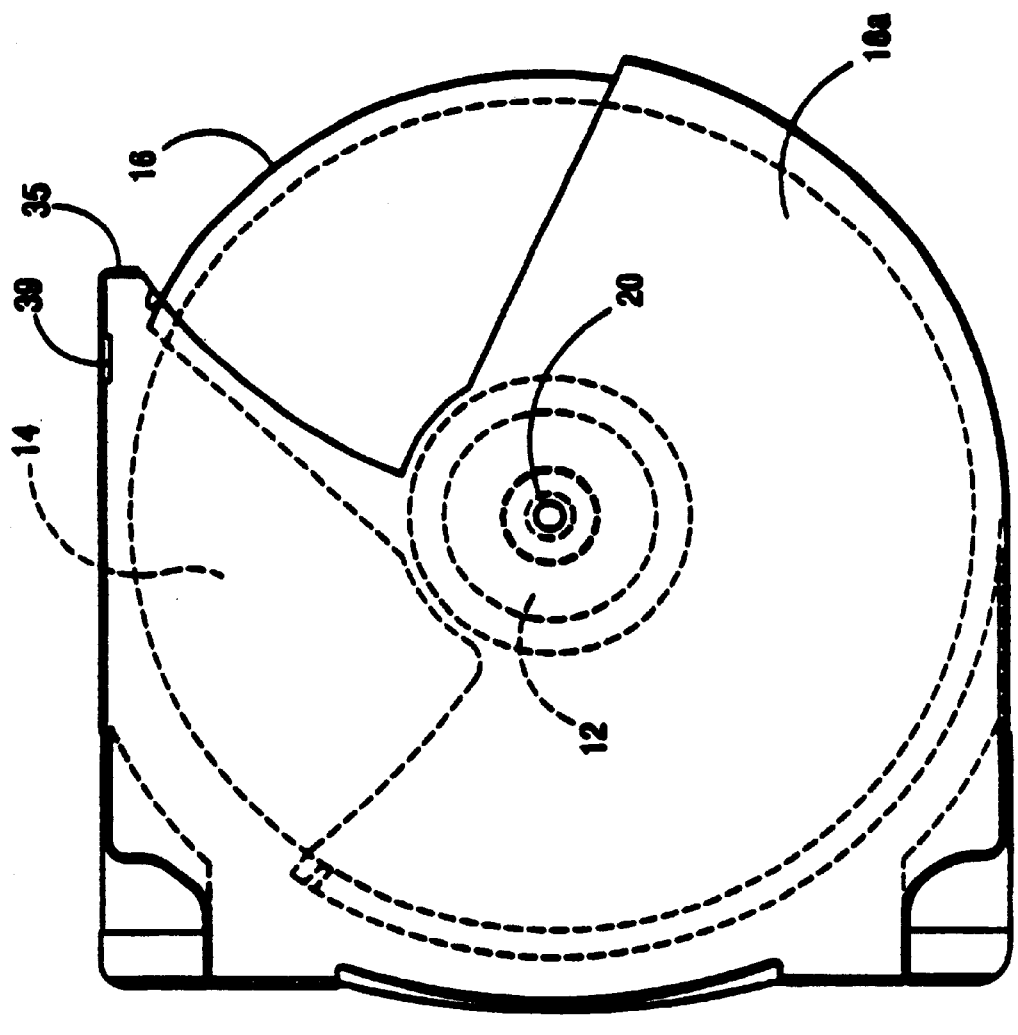
FIG. 2A is a top view of an exemplary cartridge for use with the present invention.
Figure 2B:
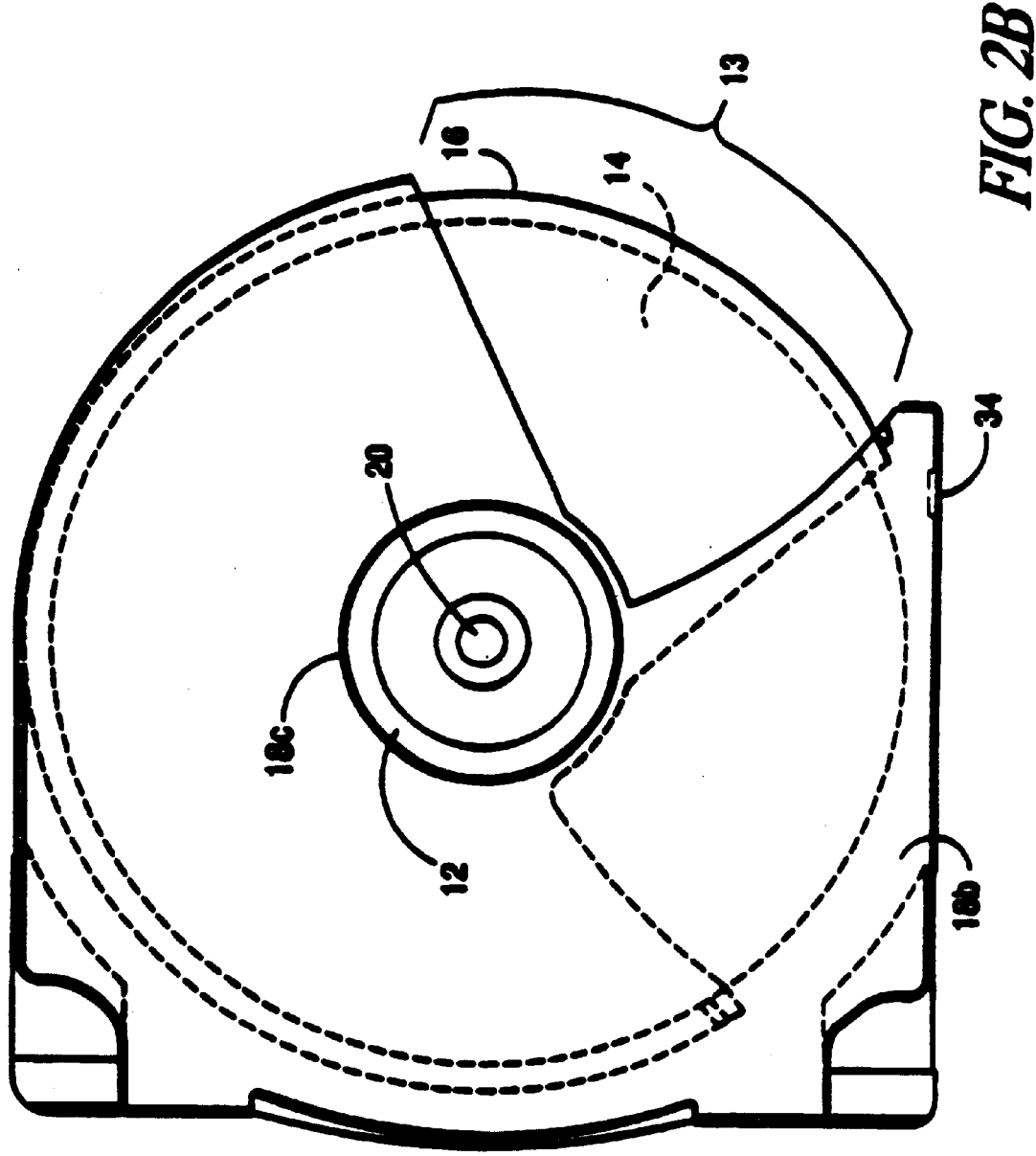
FIG. 2B is a bottom view of an exemplary cartridge for use with the present invention.
Figure 3A:
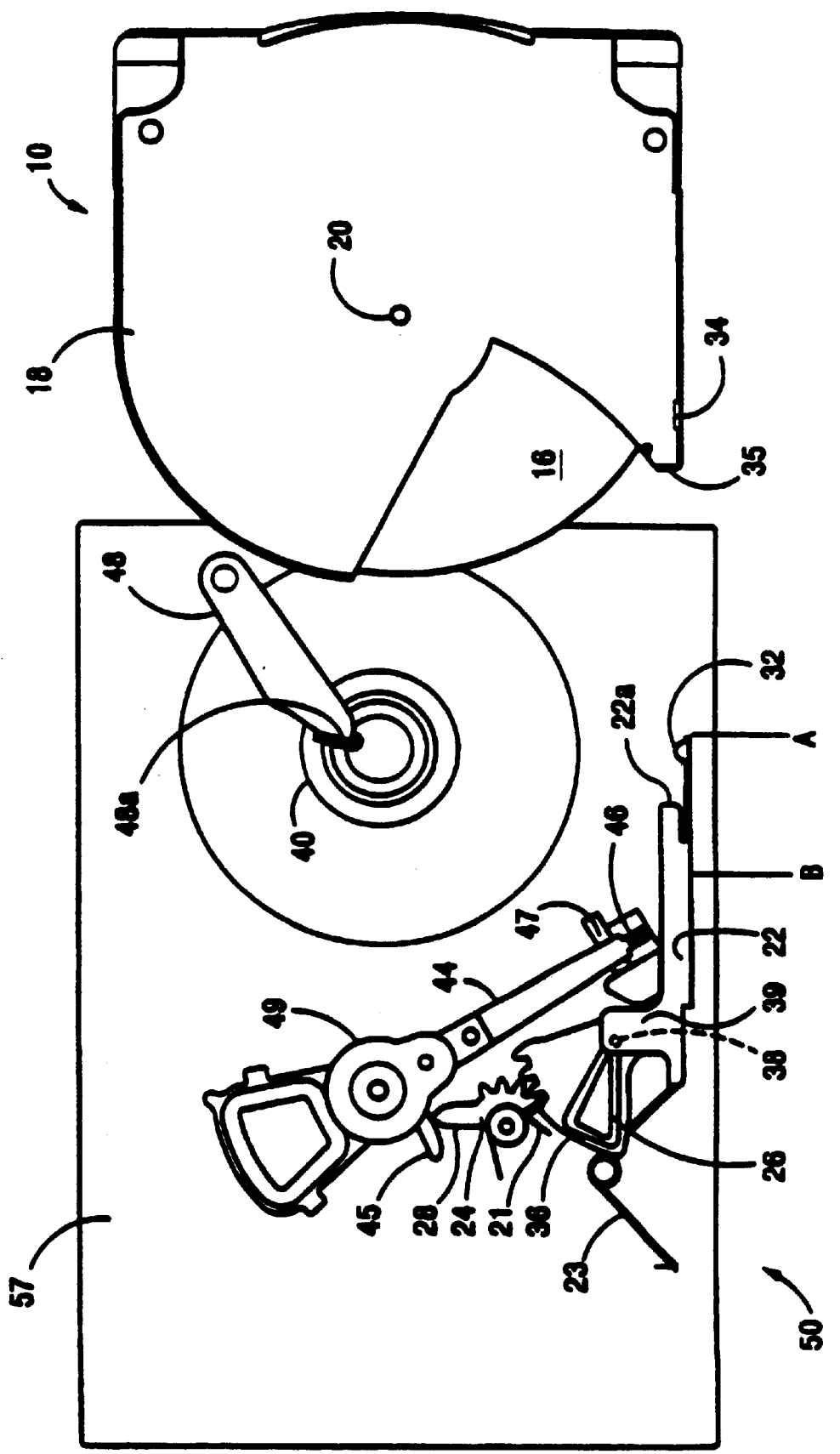
FIG. 3A shows the cartridge of FIG. 2 in an eject/pre-insertion position in relation to the drive of the present invention.
Figure 3B:
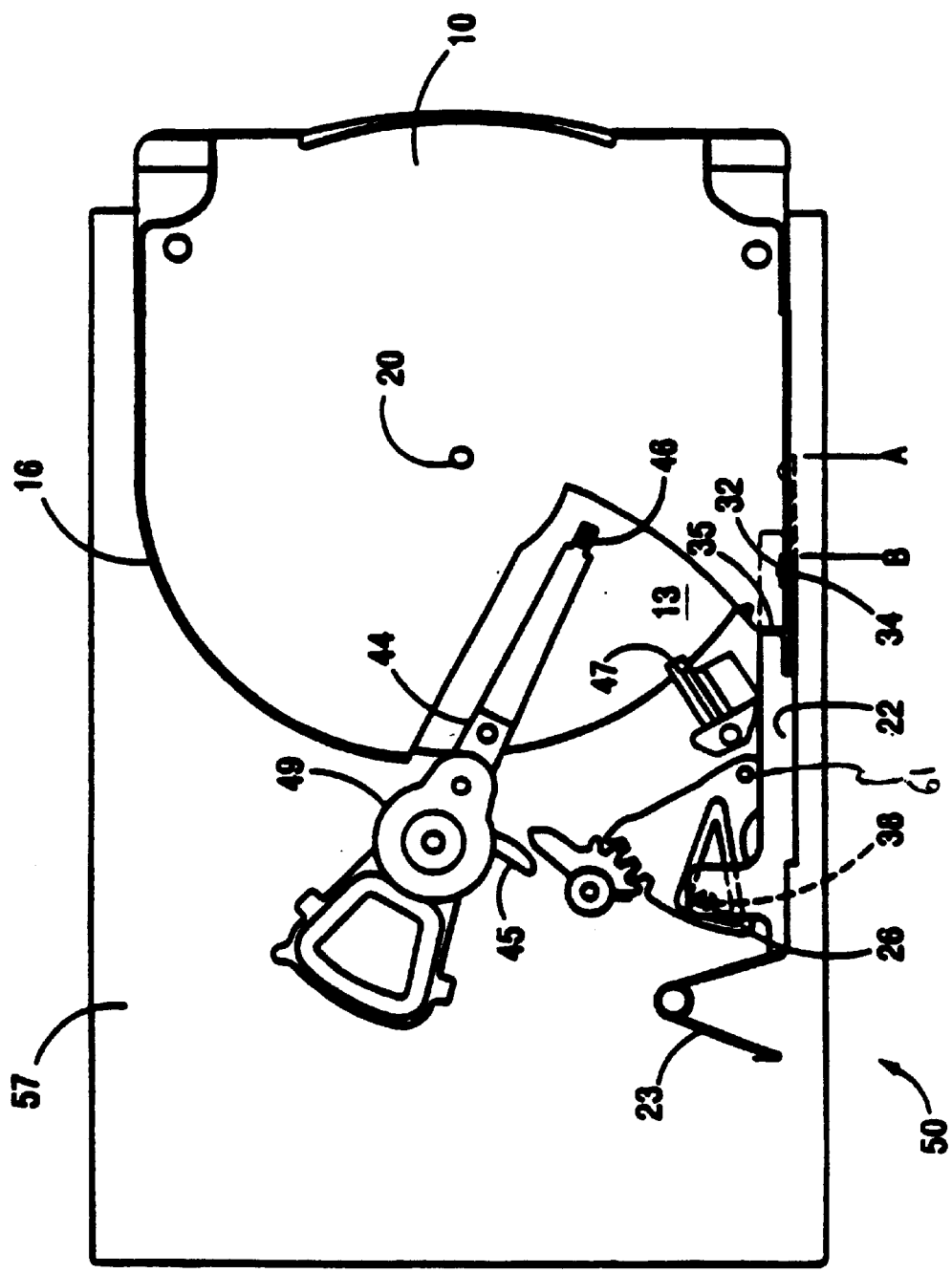
FIG. 3B shows the cartridge of FIG. 2 in a pre-eject/loaded position in relation to the drive of the present invention.
Figure 5A:
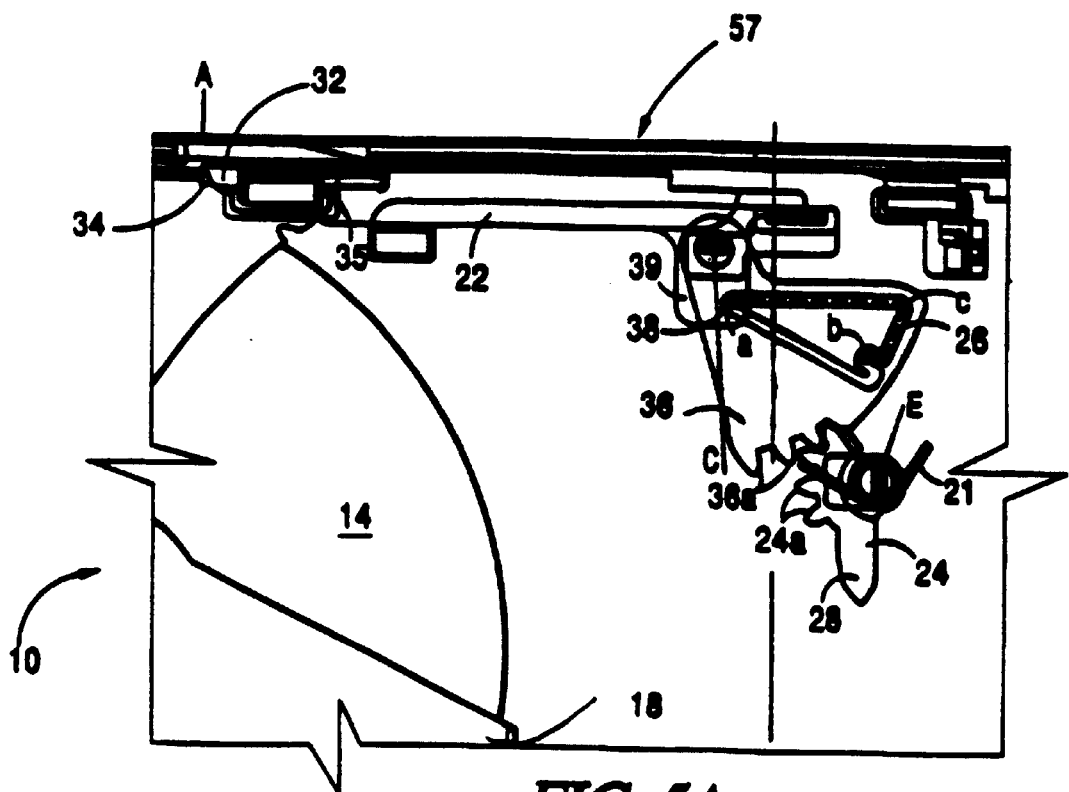
FIGS. 5A and 5B show the operation of the load eject lever in conjunction with the gear and pinion mechanism of the present invention.
Figure 5B:
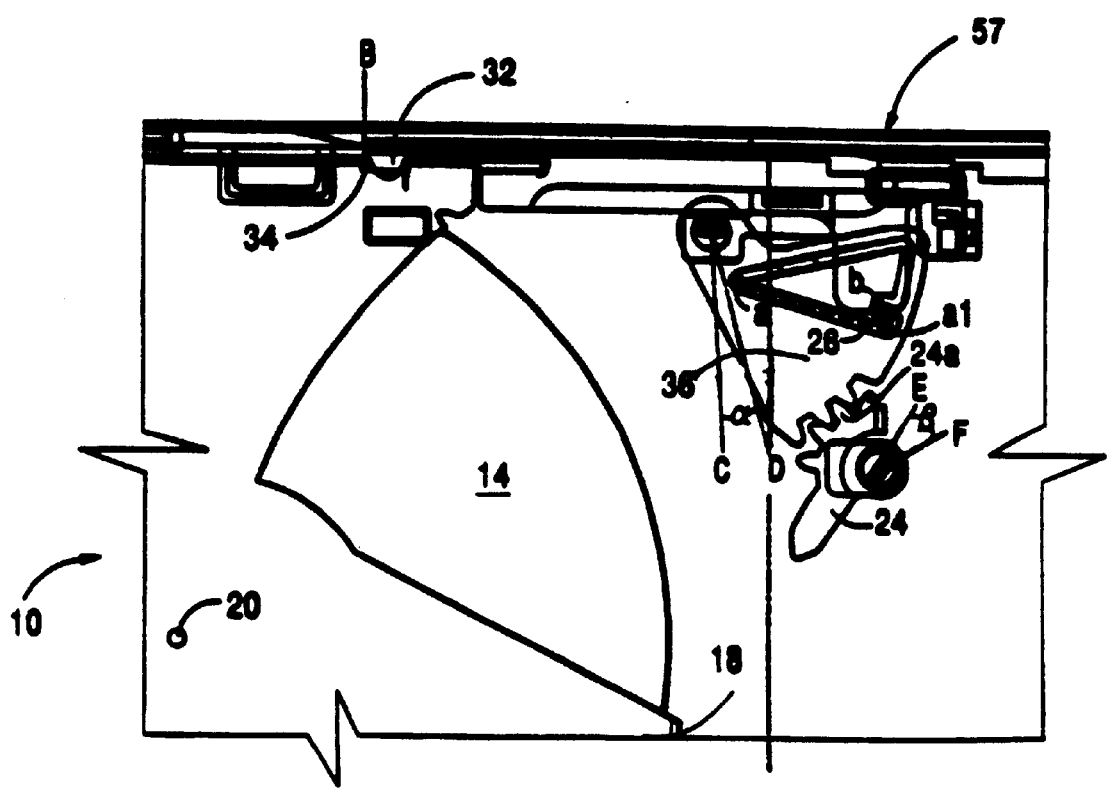
Figure 5C:
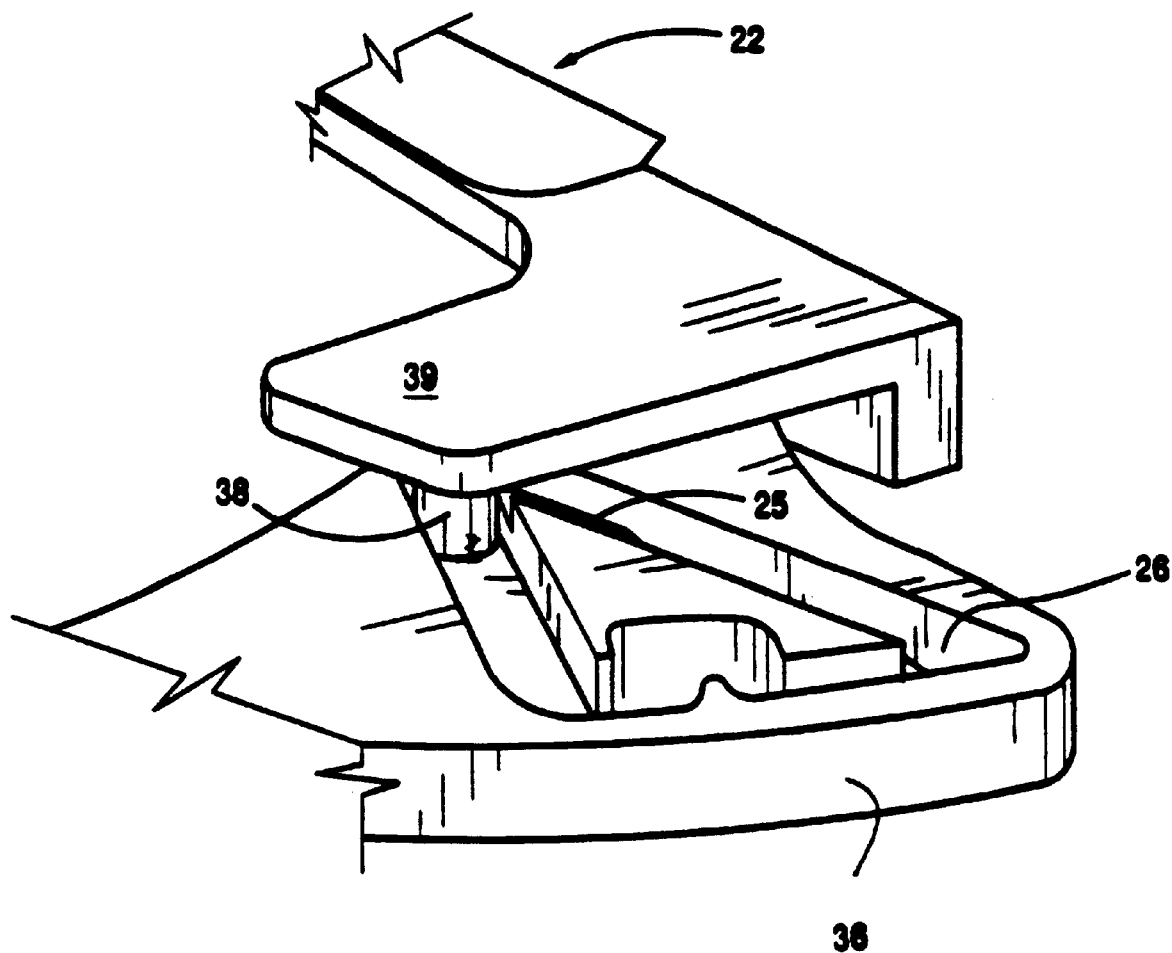
FIG. 5C shows an isometric view of pinion and sliding lever engagement.
Figure 7A:
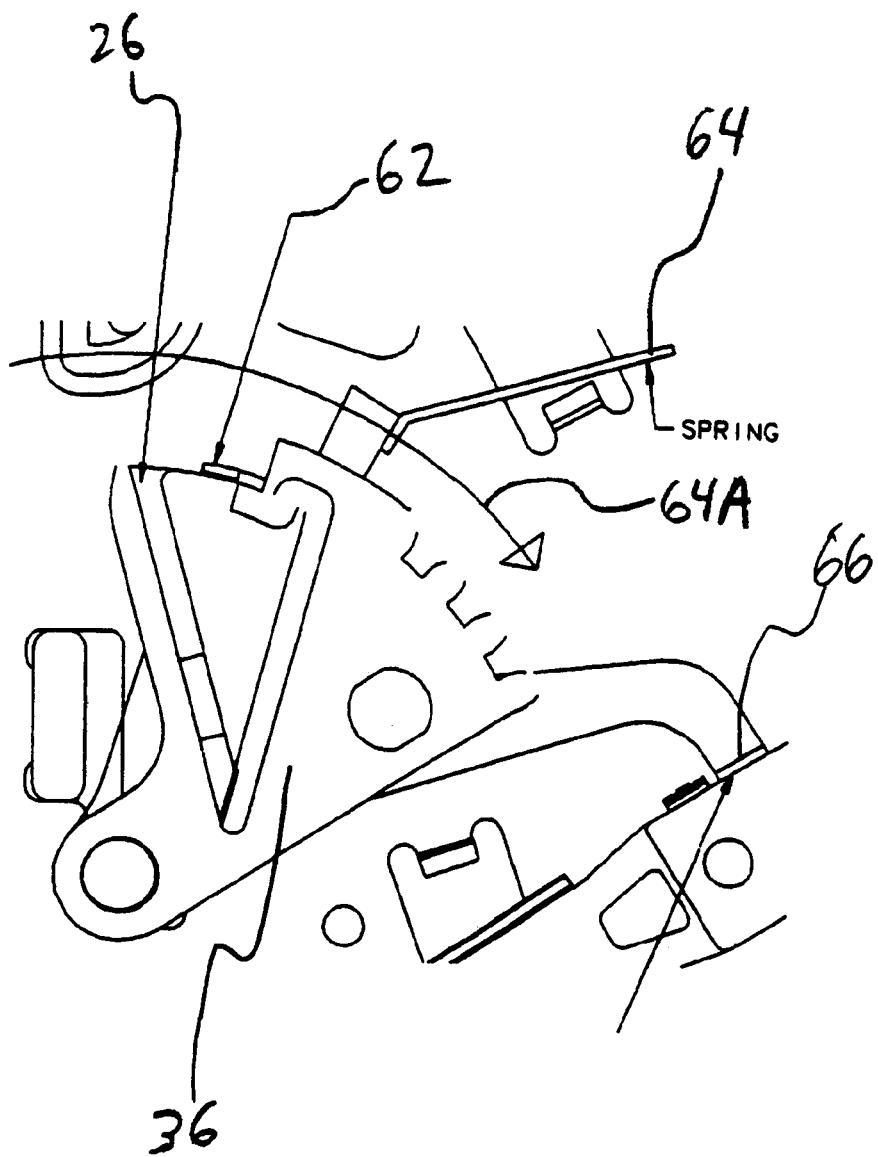
FIG. 7A is a top plan view of the apparatus of FIG. 7 with the sliding lever removed.

For illustration of the operation of the invention, FIG. 7A shows a top plan view of the apparatus of FIG. 7 with the sliding lever 22 removed. As stated above, because the actuator 49 is in the position closest to the mechanism 60 when parked, the mechanism 60 is in its counter-clockwise-most position. In this position, when the actuator 49 is parked, writing or reading is not occurring and the user may eject the cartridge. Accordingly, the impedance bend-up 62 is in its left-most position, clear of the race 26 of pinion 36, and post 38 is free to move in a counter-clockwise direction around the bend-up 62, thereby moving from point "b" to point "c" (as illustrated in FIG. 5A).

Figure 8:
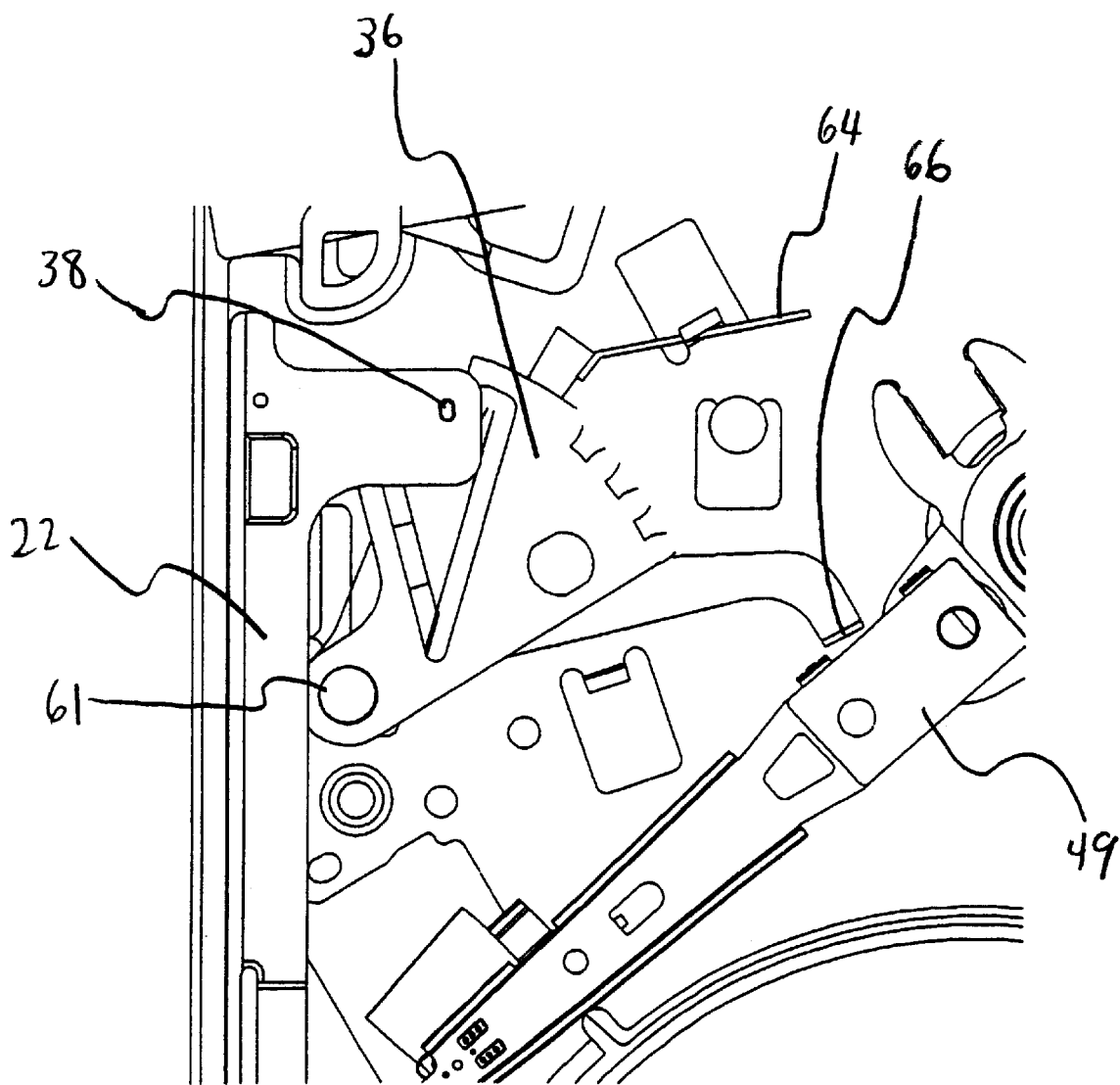
FIG. 8 is a top plan view of the slider impedance mechanism of FIG. 6 in cooperation with a disk drive when the actuator is in a reading/writing position.

FIG. 8 shows a top plan view of the slider impedance mechanism 60 of FIG. 6 in cooperation with a disk drive when the actuator 49 is in a reading/writing position. As shown in FIG. 8, the actuator follower bend-up 66 is not pressing against the actuator 49, as the actuator 49 is in a position away from the mechanism 60 when reading or writing.

Figure 8A:
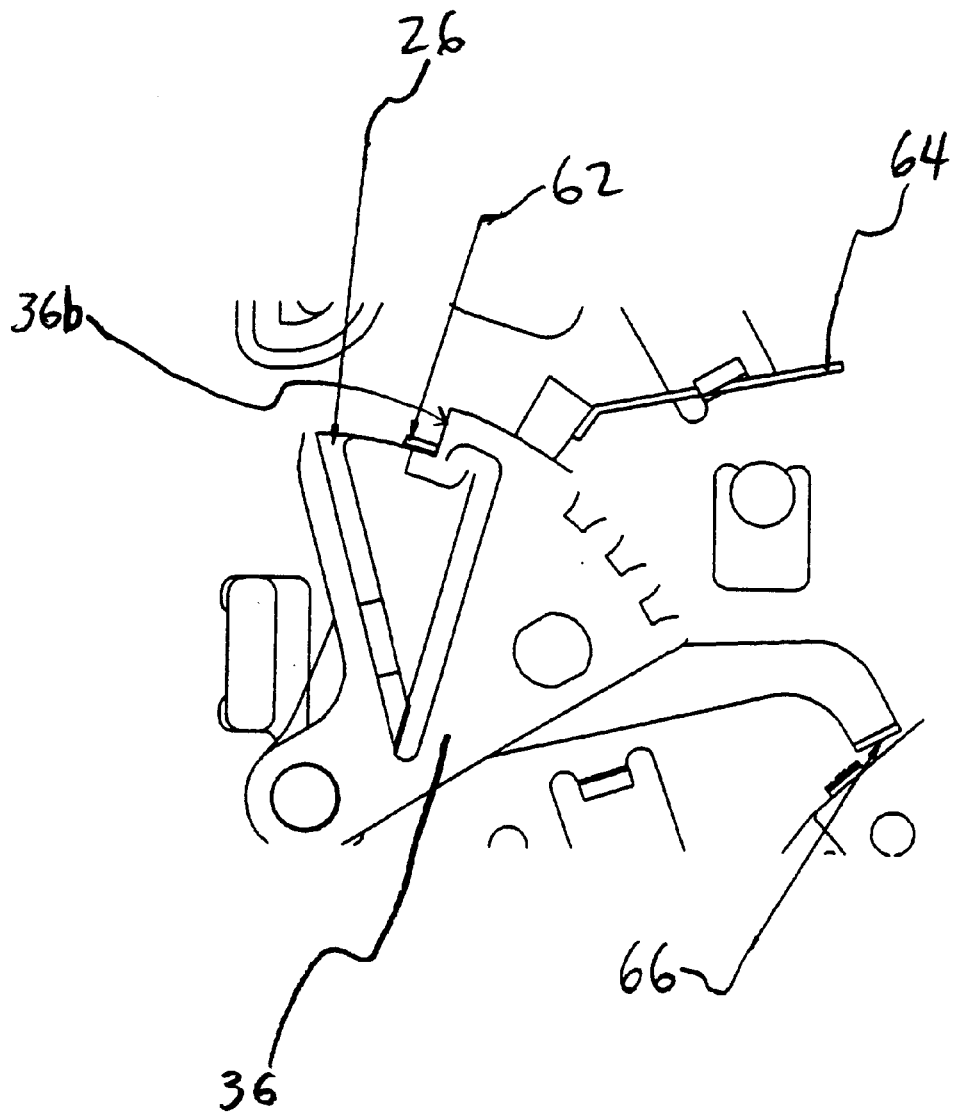
FIG. 8A is a top plan view of the apparatus of FIG. 8 with the sliding lever removed.

For illustration of the operation of the invention, FIG. 8A shows a top plan view of the apparatus of FIG. 8 with the sliding lever 22 removed. Because the actuator 49 is in a position away from the mechanism 60, the mechanism 60 is in its clockwise-most position due to the bias from the rotation spring 64, prevented from moving further clockwise because of edge 36b on the pinion 36. In this position, when the actuator 49 is reading or writing, the user may not eject the cartridge 10. Accordingly, the impedance bend-up 62 is in its right-most position, blocking the race 26 of pinion 36, and post 38 is not free to move in a counter-clockwise direction from point "b" to point "c" (as illustrated in FIG. 5A).

Thus, while reading or writing is taking place, a user may not eject the cartridge 10. Once the actuator 49 returns to the parked position, however, the impedance bend-up 62 will rotate out of the path of the race 26 and post 38 of the sliding lever 22 so that the user can eject the cartridge 10, as shown in FIGS. 7 and 7A.

As shown in the figures and as described above, the slider impedance mechanism 60 prevents ejection of a disk cartridge 10 during operation of the disk drive to prevent damage to the disk 14. Moreover, the impedance mechanism 60 operates in a relatively simple mechanical manner and is thereby, reliable and less costly than more complex systems.

It is to be understood that even though numerous characteristics and advantages of the present invention have been set forth in the foregoing description, together with details of the structure and function of the invention, the disclosure is illustrative only. Accordingly, changes may be made in detail, especially in matters of shape, size and arrangement of parts within the principles of the invention to the full extent indicated by the broad general meaning of the terms in which the appended claims are expressed.

What is claimed is:

1. A slider impedance mechanism for preventing ejection of a disk cartridge during operation of a disk drive, the mechanism comprising:
    an impedance bend-up;
    a rotation spring; and
    an actuator follower bend-up;
    wherein, when the disk drive is viewed from a top plan view and the front of the disk drive is situated on the bottom of the view;
    the mechanism rotates about a pivot point such that the rotation spring imparts a clockwise bias to the mechanism;
    the actuator follower bend-up interacts with and follows an actuator as it rotates read/write heads on and off the disk;
    and the impedance bend-up interacts with a sliding lever to prevent untimely ejection of the disk cartridge;
    wherein when the actuator is in a parked position of not reading from or writing to the disk, the mechanism is in its counter-clockwise-most position; and
    wherein the actuator is in an operating position of reading from or writing to the disk, the mechanism is in its clockwise-most position;
    wherein when the actuator is in its parked position, the disk cartridge may be elected from the disk drive; and
    when the actuator is in its operating position, the disk cartridge may not be elected from the disk drive;
    wherein the sliding lever has a post that extends down into a race situated in the pinion and wherein:
        when the actuator is in its parked position, the impedance bend-up is clear of the race and the post is free to move through the race to permit the sliding lever to eject the disk cartridge; and
        when the actuator is in its operating position, the impedance bend-up is blocking the race so that the post is not free to move through the race and the sliding lever is thereby not permitted to eject the disk cartridge from the disk drive.

2. A disk drive for recording digital information on or reading digital information from a flexible magnetic disk, which is disposed within a disk cartridge, said disk drive preventing ejection of the cartridge from the disk drive during a reading or writing operation of the disk drive, said disk drive comprising:
    read/write heads for recording digital information on or reading digital information from the disk;
    an actuator for positioning read/write heads over surfaces of the disk;
    a sliding lever for receiving and ejecting the disk cartridge from the disk drive; and
    a slider impedance lever comprising:
        an impedance projection;
        a rotation spring; and
        an actuator follower projection;
        wherein, when the disk drive is viewed from a top plan view end the front of the disk drive is situated on the bottom of the view;
        said impedance lever rotates about a pivot point such that said rotation spring imparts a clockwise bias to said impedance lever;
        said actuator follower projection interacts with and follows said actuator as it rotates said read/write heads on and off the disk; and
        said impedance projection interacts with said sliding lever to prevent untimely ejection of the disk cartridge.

3. The impedance lever of claim 2, wherein said drive includes a pinion and wherein said actuator is a rotary actuator and said impedance lever is underneath said pinion, with which said sliding lever works to receive and eject the disk cartridge.

4. The impedance lever of claim 2, wherein:
    when said actuator is in a parked position of not reading from or writing to the disk, said impedance lever is in its counter-clockwise-most position; and
    when the actuator is in an operating position of reading from or writing to the disk, said impedance lever is in its clockwise-most position.

5. The impedance lever of claim 2, wherein:
    when said actuator is in its parked position, the disk cartridge may be ejected from the disk drive; and
    when said actuator is in its operating position, said disk cartridge may not be ejected from the disk drive.

* * * * *